United States Patent
Li

(10) Patent No.: US 12,207,300 B2
(45) Date of Patent: Jan. 21, 2025

(54) METHOD AND APPARATUS FOR CHANNEL DETECTION, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 600 days.

(21) Appl. No.: 17/593,850

(22) PCT Filed: Mar. 25, 2019

(86) PCT No.: PCT/CN2019/079560
§ 371 (c)(1),
(2) Date: Sep. 26, 2021

(87) PCT Pub. No.: WO2020/191588
PCT Pub. Date: Oct. 1, 2020

(65) Prior Publication Data
US 2022/0191925 A1 Jun. 16, 2022

(51) Int. Cl.
*H04B 7/0404* (2017.01)
*H04W 74/0808* (2024.01)

(52) U.S. Cl.
CPC .............................. *H04W 74/0808* (2013.01)

(58) Field of Classification Search
CPC . H04B 7/06956; H04B 7/0691; H04B 7/0404
See application file for complete search history.

(56) References Cited

U.S. PATENT DOCUMENTS

| 6,522,896 B2 * | 2/2003 | Chuberre | H04B 7/0606 |
| | | | 455/562.1 |
| 2017/0346517 A1 | 11/2017 | Ying et al. | |
| 2018/0352577 A1 | 12/2018 | Zhang et al. | |
| 2020/0120604 A1 * | 4/2020 | Nam | H04W 76/28 |
| 2020/0374940 A1 * | 11/2020 | Jia | H04L 1/1812 |

FOREIGN PATENT DOCUMENTS

| CN | 107820259 A | 3/2018 |
| CN | 109496456 A | 3/2019 |

OTHER PUBLICATIONS

1st Office Action in CN 201980000552.3 (CN10A1) mailed Dec. 28, 2020.
International Search Report (ISR) in PCT application No. PCT/CN2019/079560 mailed Dec. 27, 2019
Huawei, HiSilicon "Codeword to layer mapping in NR (R1-1705073)" 3GPP TSG RAN WG1 Meeting # 88 b is R1 17 05073 Spokane, USA , 3 rd 7 th Apr. 2017.

* cited by examiner

*Primary Examiner* — Bo Hui A Zhu
(74) *Attorney, Agent, or Firm* — Syncoda LLC; Feng Ma

(57) ABSTRACT

A method for channel detection is performed by a wireless communication device including n antenna panels, wherein n is an integer greater than or equal to 2. The method includes: obtaining channel detection control information of each of k antenna panels among the n antenna panels; and respectively controlling the k antenna panels to perform the channel detection through the channel detection control information of each of the k antenna panels.

20 Claims, 3 Drawing Sheets

METHOD AND APPARATUS FOR CHANNEL DETECTION, AND STORAGE MEDIUM

CROSS-REFERENCE TO RELATED APPLICATION

This application is a U.S. national stage of International Application No. PCT/CN2019/079560 filed on Mar. 25, 2019, the disclosure of which is hereby incorporated by reference in its entirety.

TECHNICAL FIELD

Embodiments of the present disclosure relate to the field of communication technology, and in particular, to a method and device for channel detection, and a storage medium.

BACKGROUND

With the rapid development of communication technology, a wireless communication network has moved towards the fifth-generation mobile communication (5G) network. In the 5G system, wireless communication devices may transmit data to each other on the unlicensed spectrum.

In the related technology, the wireless communication devices may detect channel resources for transmitting data in an LBT (Listen Before Talk) manner by using antenna panels thereof before transmitting data to each other on the unlicensed spectrum. In the 5G system, most wireless communication devices may be provided with a plurality of antenna panels to transmit data. At present, there is no perfect solution for how the wireless communication device uses the plurality of antenna panels for channel detection.

SUMMARY

Embodiment of the present disclosure provide a method and device for channel detection, and a storage medium. The technical solution is as follows.

A first aspect of embodiments of the present disclosure provides a method for channel detection, which is performed by a wireless communication device including n antenna panels, n being an integer greater than or equal to 2. The method includes:
  obtaining channel detection control information of each of k antenna panels among the n antenna panels; and
  respectively controlling the k antenna panels to perform the channel detection through the channel detection control information of each of the k antenna panels.

Optionally, when the wireless communication device is a base station, obtaining the channel detection control information of each of the k antenna panels among the n antenna panels includes:
  obtaining the channel detection control information respectively set for the k antenna panels,
  wherein the channel detection control information includes at least one of:
  a channel detection mechanism of a corresponding antenna panel, a channel detection parameter of the corresponding antenna panel, and a channel detection threshold of the corresponding antenna panel.

Optionally, obtaining the channel detection control information respectively set for the k antenna panels includes:
  obtaining the channel detection control information corresponding to a target antenna panel, the channel detection control information corresponding to the target antenna panel including channel detection control sub-information set for at least one beam direction corresponding to the target antenna panel, and the target antenna panel being any one of the k antenna panels,
  wherein the channel detection control sub-information includes at least one of:
  a channel detection mechanism corresponding to a beam direction, a channel detection parameter corresponding to the beam direction, and a channel detection threshold corresponding to the beam direction.

Optionally, before respectively controlling the k antenna panels to perform the channel detection through the channel detection control information of each of the k antenna panels, the method further includes:
  determining a detection order of the at least one beam direction according to a priority of a terminal corresponding to the at least one beam direction, and
  respectively controlling the k antenna panels to perform the channel detection through the channel detection control information of each of the k antenna panels includes:
  according to the detection order of the at least one beam direction, controlling the target antenna panel to sequentially perform the channel detection in the at least one beam direction through the channel detection control sub-information respectively corresponding to the at least one beam direction.

Optionally, a continuous detection duration in each of the at least one beam direction is not greater than a duration threshold.

Optionally, the channel detection parameter includes a contention window size (CWS), and
  when the channel detection control information includes the channel detection parameter of the corresponding antenna panel, obtaining the channel detection control information respectively set for the k antenna panels includes:
  adjusting competition window sizes (CWSs) respectively corresponding to the k antenna panels.

Optionally, the channel detection parameter includes a contention window size (CWS), and when the channel detection control sub-information includes the channel detection parameter corresponding to the beam direction, obtaining the channel detection control information corresponding to the target antenna panel includes:
  adjusting respective competition window sizes (CWSs) of the at least one beam direction corresponding to the target antenna panel.

Optionally, when the wireless communication device is a terminal, before obtaining the channel detection control information of each of the k antenna panels among the n antenna panels, the method further includes:
  receiving channel detection indication information sent by a base station, the channel detection indication information including identities of the k antenna panels and the channel detection control information of each of the k antenna panels.

Optionally, the channel detection control information includes at least one of:
  a channel detection mechanism of a corresponding antenna panel, a channel detection parameter of the corresponding antenna panel, and a channel detection threshold of the corresponding antenna panel.

Optionally, when the wireless communication device is a terminal, before obtaining the channel detection control information of each of the k antenna panels among the n antenna panels, the method further includes:

determining the k antenna panels from the n antenna panels according to a type of data transceived by the n antenna panels within a preset time.

Optionally, determining the k antenna panels from the n antenna panels according to the type of data transceived by the n antenna panels within the preset time includes:

when information received by the n antenna panels within the preset time is a synchronization signal block (SSB) or a channel state information reference signal (CSI-RS), determining an antenna panel having a strongest received power for the SSB or the CSI-RS to be the k antenna panels;

when the information received by the n antenna panels within the preset time is a physical downlink control channel (PDCCH) or a physical downlink shared channel (PDSCH), determining an antenna panel receiving the PDCCH or the PDSCH to be the k antenna panels; and when the information sent by the n antenna panels within the preset time is a channel sounding reference signal (SRS), a physical uplink control channel (PUCCH) or a physical uplink shared channel (PUSCH), determining an antenna panel sending the SRS, the PUCCH or the PUSCH to be the k antenna panels.

Optionally, the method further includes:

when the antenna panel sending the SRS, the PUCCH or the PUSCH is determined to be the k antenna panels, determining a beam-receiving direction corresponding to a beam for sending the SRS, the PUCCH or the PUSCH to be a beam-detecting direction for the channel detection, and respectively controlling the k antenna panels to perform the channel detection through the channel detection control information of each of the k antenna panels includes:

respectively controlling the k antenna panels to perform the channel detection in the beam-detecting direction through the channel detection control information of each of the k antenna panels.

A second aspect of the embodiments of the present disclosure provides advice for channel detection, which is applied to a wireless communication device including n antenna panels, n being an integer greater than or equal to 2. The device for channel detection includes:

an obtaining module, configured to obtain channel detection control information of each of k antenna panels among the n antenna panels; and a controlling module, configured to respectively control the k antenna panels to perform the channel detection through the channel detection control information of each of the k antenna panels.

Optionally, the obtaining module includes a first obtaining submodule configured to obtain the channel detection control information respectively set for the k antenna panels when the wireless communication device is a base station, and wherein the channel detection control information includes at least one of:

a channel detection mechanism of a corresponding antenna panel, a channel detection parameter of the corresponding antenna panel, and a channel detection threshold of the corresponding antenna panel.

Optionally, the first obtaining submodule is configured to obtain the channel detection control information corresponding to a target antenna panel, the channel detection control information corresponding to the target antenna panel includes channel detection control sub-information set for at least one beam direction corresponding to the target antenna panel, and the target antenna panel is any one of the k antenna panels, and wherein the channel detection control sub-information includes at least one of:

a channel detection mechanism corresponding to a beam direction, a channel detection parameter corresponding to the beam direction, and a channel detection threshold corresponding to the beam direction.

Optionally the device for channel detection further includes:

a determining module, configured to determine a detection order of the at least one beam direction according to a priority of a terminal corresponding to the at least one beam direction before the control module respectively controls the k antenna panels to perform the channel detection through the channel detection control information of each of the k antenna panels, and the control module is configured to, according to the detection order of the at least one beam direction, control the target antenna panel to sequentially perform the channel detection in the at least one beam direction through the channel detection control sub-information respectively corresponding to the at least one beam direction.

Optionally, a continuous detection duration in each of the at least one beam direction is not greater than a duration threshold.

Optionally, the channel detection parameter includes a contention window size (CWS), and the first obtaining submodule is configured to, when the channel detection control information includes the channel detection parameter of the corresponding antenna panel, independently adjust competition window sizes (CWSs) respectively corresponding to the k antenna panels.

Optionally, the channel detection parameter includes a contention window size (CWS), and the first obtaining submodule is configured to, when the channel detection control sub-information includes the channel detection parameter corresponding to the beam direction, adjust respective competition window sizes (CWSs) of the at least one beam direction corresponding to the target antenna panel. The target antenna panel is any one of the k antenna panels.

Optionally, the device for channel detection further includes:

a receiving module, configured to, when the wireless communication device is a terminal, receive channel detection indication information sent by a base station before the obtaining module obtains the channel detection control information of each of the k antenna panels among the n antenna panels, wherein the channel detection indication information includes identities of the k antenna panels and the channel detection control information of each of the k antenna panels.

Optionally, the channel detection control information includes at least one of:

a channel detection mechanism of a corresponding antenna panel, a channel detection parameter of the corresponding antenna panel, and a channel detection threshold of the corresponding antenna panel.

Optionally, the device for channel detection further includes:

a panel determining module, configured to, when the wireless communication device is a terminal, determine the k antenna panels from the n antenna panels according to a type of data transceived recently by the n antenna panels before the obtaining module obtains the channel detection control information of each of the k antenna panels among the n antenna panels.

Optionally, the panel determining module includes:

a first determining submodule, configured to, when information received by the n antenna panels within the preset time is a synchronization signal block (SSB) or a channel state information reference signal (CSI-RS), determine an antenna panel having a strongest received power for the SSB or the CSI-RS to be the k antenna panels;

a second determining submodule, configured to, when the information received by the n antenna panels within the preset time is a physical downlink control channel (PDCCH) or a physical downlink shared channel (PDSCH), determine an antenna panel receiving the PDCCH or the PDSCH to be the k antenna panels; and a third determining submodule, configured to, when the information sent by the n antenna panels within the preset time is a channel sounding reference signal (SRS), a physical uplink control channel (PUCCH) or a physical uplink shared channel (PUSCH), determine an antenna panel sending the SRS, the PUCCH or the PUSCH to be the k antenna panels.

Optionally, the device for channel detection further includes:

a direction determining module, configured to, when the third determining submodule determines the antenna panel sending the SRS, the PUCCH or the PUSCH to be the k antenna panels, determine a beam-receiving direction corresponding to a beam for sending the SRS, the PUCCH or the PUSCH to be a beam-detecting direction for the channel detection, and the controlling module is configured to:

respectively control the k antenna panels to perform the channel detection in the beam-detecting direction through the channel detection control information of each of the k antenna panels.

A third aspect of the embodiments of the present disclosure provides a device for channel detection, which is applied to a wireless communication device including n antenna panels, n being an integer greater than or equal to 2. The device for channel detection includes:

a processor; and a memory for storing executable instructions of the processor, wherein the processor is configured to:

obtain channel detection control information of each of k antenna panels among the n antenna panels; and respectively control the k antenna panels to perform the channel detection through the channel detection control information of each of the k antenna panels.

A third aspect of the embodiments of the present disclosure provides a computer-readable storage medium containing executable instructions. A processor in a wireless communication device invokes the executable instructions to implement the method for channel detection according to the first aspect or any optional solution in the first aspect.

The technical solutions provided by the embodiments of the present disclosure include at least the following beneficial effects.

The wireless communication device obtains channel detection control information of each of k antenna panels among n antenna panels of the wireless communication device; and respectively controls the k antenna panels to perform the channel detection through the channel detection control information of each of the k antenna panels. Therefore, for the wireless communication device with a plurality of antenna panels, the present disclosure respectively controls the k antenna panels to perform the channel detection through the channel detection control information of each of the k antenna panels among the n antenna panels of the wireless communication device, so that the wireless communication device can perform channel detection based on different antenna panels thereof, which expands the application scenarios of the wireless communication device for channel detection.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments that conform to the present disclosure, and together with the specification, serve to explain the principle of the present disclosure.

DETAILED DESCRIPTION

Exemplary embodiments will be described in detail here, and examples thereof are illustrated in the accompanying drawings. When the following description is made with reference to the drawings, unless otherwise indicated, the same numbers in different drawings indicate the same or similar elements. The implementation described in the following exemplary embodiments do not represent all implementations consistent with the present disclosure. Rather, they are merely examples of devices and methods consistent with some aspects of the present disclosure as detailed in the appended claims.

The system architecture and business scenarios described in the embodiments of the present disclosure are intended to more clearly illustrate the technical solutions of the embodiments of the present disclosure, and do not constitute a limitation on the technical solutions provided by the embodiments of the present disclosure. Those skilled in the art will know that with the evolution of the system architecture and the emergence of new business scenarios, the technical solutions provided by the embodiments of the present disclosure are equally applicable to similar technical problems.

The radio spectrum resource is a limited, non-renewable natural resource. Therefore, various countries have special management organizations for the radio spectrum and issue special policies and regulations to realize the unified planning and management of the radio spectrum. At present, the spectrum management in various countries mostly adopt a fixed spectrum allocation strategy, that is, the spectrum resources are managed and allocated by government authorities to fixed authorized users, which can ensure that the users avoid excessive mutual interference and make better use of spectrum resources. Currently, the spectrum resources may be divided into two categories, i.e., a licensed spectrum and an unlicensed spectrum.

The unlicensed spectrum is a spectrum that can be accessed and used by devices that meet certain specifications and standards, but it must be guaranteed not to cause interference to other users. Typically, communication technologies such as Wireless Fidelity (Wi-Fi) and Bluetooth (BT) are transmitted through the unlicensed spectrum. In addition, the International Telecommunications Union-Radio communications Sector has defined the Industrial Scientific Medical (ISM) frequency band, which is mainly open for use by three types of institutions: industry, science, and medicine, requires no authorization but a certain transmission power, and can not cause interference to other frequency bands.

With the increasing communication demands of mobile data, the data transmission in 5G systems has been extended to the unlicensed spectrum.

Figure 1:
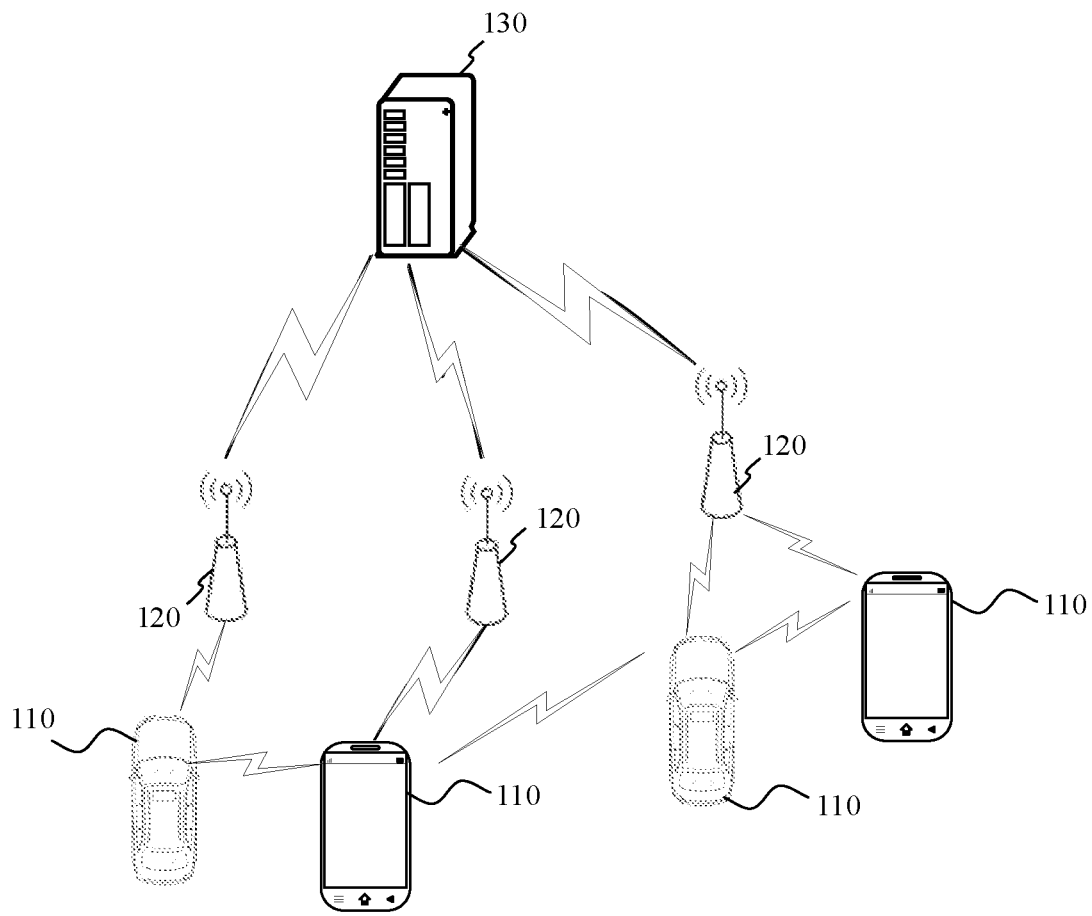
FIG. 1 is a schematic structural diagram of a wireless communication system according to an embodiment of the present disclosure.

FIG. 1 illustrates a schematic structural diagram of a wireless communication system according to an embodiment of the present disclosure. As illustrated in FIG. 1, the wireless communication system is a communication system based on cellular mobile communication technology. The wireless communication system may include a plurality of terminals 110 and a plurality of base stations 120.

The terminal 110 may be a device that provides voice and/or data connectivity to a user. The terminal 110 may communicate with one or more core networks via a radio access network (RAN). The terminal 110 may be an Internet of Things terminal such as a sensor device, a mobile phone (or "cellular" phone), and a computer having the Internet of Things terminal, for example, may be a fixed, portable, pocket-sized, handheld, built-in computer or vehicle-mounted device, for example, a station (STA), subscriber unit, subscriber station, mobile station, mobile, remote station, access point, remote terminal, access terminal, user terminal, user agent, user device, or user equipment (UE). Alternatively, the terminal 110 may also be a device of an unmanned aerial vehicle. Alternatively, the terminal 110 may also be a vehicle-mounted device, for example, may be a trip computer with a wireless communication function, or a wireless communication device connected to the trip computer. Alternatively, the terminal 110 may also be a roadside device, for example, may be a street lamp, signal lamp, or other roadside device with a wireless communication function.

The base station 120 may be a network side device in a wireless communication system. The wireless communication system may be a 4th generation mobile communication (4G) system, also known as the Long-Term Evolution (LTE) system. Alternatively, the wireless communication system may also be a 5G system, also known as a new radio (NR) system or 5G NR system. Alternatively, the wireless communication system may also be a next-generation system of the 5G system. An access network in the 5G system may be called NG-RAN (New Generation-Radio Access Network).

The base station 120 may be an evolved base station (eNB) used in the 4G system. Alternatively, the base station 120 may also be a base station (gNB) adopting a centralized and distributed architecture in the 5G system. When the base station 120 adopts the centralized and distributed architecture, the base station 120 usually includes a central unit (CU) and at least two distributed units (DU). The central unit is provided with a protocol stack of a packet data convergence protocol (PDCP) layer, a radio link control protocol (RLC) layer, and a media access control (MAC) layer. The distributed unit is provided with a physical (PHY) layer protocol stack. The specific implementation of the base station 120 is not limited in the embodiments of the present disclosure.

A wireless connection may be established between the base station 120 and the terminal 110 through a wireless air interface. In different embodiments, the wireless air interface is a wireless air interface based on the fourth-generation mobile communication network technology (4G) standard. Alternatively, the wireless air interface is a wireless air interface based on the fifth-generation mobile communication network technology (5G) standard, for example, the wireless air interface is a new radio. Alternatively, the wireless air interface may also be a wireless air interface based on a 5G-based next-generation mobile communication network technology standard.

Optionally, an E2E (end to end) or D2D (device to device) connection may also be established between the terminals 110, for example, in vehicle to everything (V2X) communication scenarios such as V2V (vehicle to vehicle) communication, V2I (vehicle to infrastructure) communication, and V2P (vehicle to pedestrian) communication.

Optionally, the above wireless communication system may further include a network management device 130.

The plurality of base stations 120 are connected to the network management device 130 respectively. The network management device 130 may be a core network device in a wireless communication system. For example, the network management device 130 may be a mobility management entity (MME) in an evolved packet core (EPC). Alternatively, the network management device may also be other core network devices, such as a serving gateway (SGW), a public data network gateway (PGW), a policy and charging rules function (PCRF), a home subscriber server (HSS) or the like. The implementation form of the network management device 130 is not limited in the embodiments of the present disclosure.

In the wireless communication system illustrated in FIG. 1, data may be transmitted between the base station and the device, and between the devices based on the unlicensed spectrum. The base station or terminal in the above wireless communication system may be collectively referred to as a wireless communication device. When the wireless communication device transmits data on the unlicensed spectrum, the wireless communication device may detect channel resources for transmitting data in an LBT manner before transmitting the data. When a corresponding detection result is idle, the wireless communication device may transmit data on a corresponding channel resource. In addition, when a plurality of devices share resources in a resource pool, for example, in D2D or V2X, the base station configures a resource pool. Before the plurality of devices select resources in the resource pool for transmission, they also need to detect whether the resources are occupied by other devices, and only when it is detected that the resources are not occupied by the other devices, they can perform transmission on the corresponding resource.

In the related art, the wireless communication device usually performs channel detection by using an omnidirectional antenna. For example, the wireless communication device detects and receives surrounding RSSI (received signal strength indicator) by using the omnidirectional antenna, to obtain a sum of the surrounding RSSI that can be received in each direction and in each time granularity. Then the wireless communication device compares the obtained RSSI sum with a threshold corresponding to a detection mechanism adopted by the wireless communication device. When the RSSI sum is higher than the threshold, it means that the channel resource within the time granularity is occupied and cannot be used by the wireless communication device to transmit data within the time granularity. When the total RSSI is less than or equal to the threshold, it means that the channel resource within the time granularity is not occupied, and can be used by the wireless communication device to transmit data within the time granularity.

Optionally, when the wireless communication device is the base station in the above wireless communication system, the base station may perform channel detection through a channel detection mechanism of LBT cat.2 before sending a downlink reference signal to a terminal. In the channel detection mechanism of the LBT cat.2, whether the channel resource of the corresponding downlink reference signal is idle is detected with a time granularity of 25 us, if it is idle, the downlink reference signal is sent, otherwise, the detection is continued.

In a possible implementation, when the wireless communication device needs to transmit data, a channel detection mechanism of LBT cat.4 may also be used for channel detection. The principle of the channel detection mechanism of the LBT cat.4 may be as follows.

First, the wireless communication device detects whether the corresponding channel resource is idle within a first time granularity. If a detection result at this time is idle, it means that the detected channel resource is idle. If the detection result at this time is busy, the wireless communication device determines a value of CWS (contention window size), and then takes a random number S (S is a positive integer) from 0 to CWS value. The wireless communication device detects whether the corresponding channel resource is idle with a second time granularity, if the detection result is idle, the random number S is reduced by 1; otherwise, the wireless communication device detects whether the corresponding channel resource is idle with the first time granularity, if the detection result is idle, the random number S is reduced by 1; and then the wireless communication device detects whether the corresponding channel resource is idle with the second time granularity, which is repeated until the random number S is reduced to 0, which indicates that the channel is idle, and the channel may be occupied to transmit data on the corresponding channel.

Optionally, the above first time granularity may be 16 us+M*9 us (the value of M may be determined by a channel access priority level h in Table 1 below, that is, different priority levels correspond to different values of M), and the second time granularity may be 9 us. Table 1 illustrates a detection parameter table corresponding to the LBT cat.4 detection mechanism according to an embodiment of the present disclosure. Table 1 includes the channel access priority level h, parameter M, minimum value of CWS $CWS_{min}$, maximum value of CWS $CWS_{max}$, occupying duration T for transmitting data, CWS interval.

It can be seen from Table 1 that the size of the CWS value determines the value range of the random number S, different terminals use the channel resource at different priorities, and for different channel access priority levels, there are different parameters corresponding to different channel access priority levels h in Table 1. That is, for different channel access priority levels h, the optional value of CWS may be different.

TABLE 1

| channel access priority level (h) | M | $CWS_{min}$ | $CWS_{max}$ | T | CWS interval |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 ms or 10 ms | {15, 31, 63} |
| 4 | 7 | 15 | 1023 | 8 ms or 10 ms | {15, 31, 63, 127, 255, 511, 1023} |

In the 5G system, in order to increase the rate of data transmission between the wireless communication devices, most wireless communication devices may be provided with a plurality of antenna panels for data transmission. Optionally, the plurality of antenna panels of the wireless communication device may belong to the same TRP (transmitter receiver point) or a plurality of different TRPs. That is, the wireless communication device may have one or more TRPs, and each TRP may have one or more antenna panels, and different antenna panels may correspond to different beam directions. The same antenna panel may only point to one beam direction at a time, and different antenna panels may point to different beam directions at the same time, that is, each antenna panel points to one beam direction. At present, there is no perfect solution for how a plurality of antenna panels perform channel detection before transmitting data.

Figure 2:
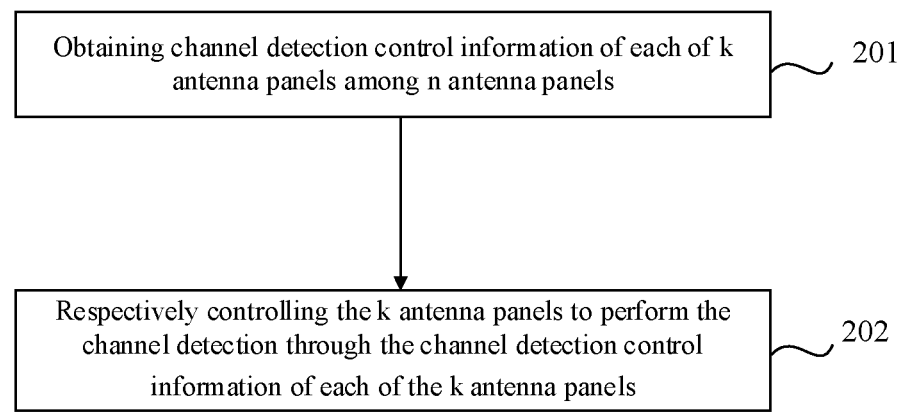
FIG. 2 is a flowchart of a method for channel detection according to an embodiment of the present disclosure.

FIG. 2 illustrates a flowchart of a method for channel detection according to an embodiment of the present disclosure. The method may be applied to the wireless communication system shown in FIG. 1, and is executed by a wireless communication device in the wireless communication system. The wireless communication device includes n antenna panels, and n is an integer greater than or equal to 2. As illustrated in FIG. 2, the method may include:

step 201, obtaining channel detection control information of each of k antenna panels among the n antenna panels; and step 202, respectively controlling the k antenna panels to perform the channel detection through the channel detection control information of each of the k antenna panels.

Optionally, when the wireless communication device is a base station, obtaining the channel detection control information of each of the k antenna panels among the n antenna panels includes:

obtaining the channel detection control information respectively set for the k antenna panels.

The channel detection control information includes at least one of: a channel detection mechanism of a corresponding antenna panel, a channel detection parameter of the corresponding antenna panel, and a channel detection threshold of the corresponding antenna panel.

Optionally, obtaining the channel detection control information respectively set for the k antenna panels includes:

obtaining the channel detection control information corresponding to a target antenna panel, the channel detection control information corresponding to the target antenna panel including channel detection control sub-information set for at least one beam direction corresponding to the target antenna panel, and the target antenna panel being any one of the k antenna panels.

The channel detection control sub-information includes at least one of: a channel detection mechanism corresponding to a beam direction, a channel detection parameter corresponding to the beam direction, and a channel detection threshold corresponding to the beam direction.

Optionally, before respectively controlling the k antenna panels to perform the channel detection through the channel detection control information of each of the k antenna panels, the method further includes:

determining a detection order of the at least one beam direction according to a priority of a terminal corresponding to the at least one beam direction, and respectively controlling the k antenna panels to perform the channel detection through the channel detection control information of each of the k antenna panels comprises:

according to the detection order of the at least one beam direction, controlling the target antenna panel to sequentially perform the channel detection in the at least one beam direction through the channel detection control sub-information respectively corresponding to the at least one beam direction.

Optionally, a continuous detection duration in each of the at least one beam direction is not greater than a duration threshold.

Optionally, the channel detection parameter includes a contention window size (CWS). When the channel detection control information includes the channel detection parameter of the corresponding antenna panel, obtaining the channel detection control information respectively set for the k antenna panels includes:

adjusting competition window sizes (CWSs) respectively corresponding to the k antenna panels.

Optionally, the channel detection parameter includes a contention window size (CWS). When the channel detection control sub-information includes the channel detection parameter corresponding to the beam direction, obtaining the channel detection control information corresponding to the target antenna panel includes:

adjusting respective competition window sizes (CWSs) of the at least one beam direction corresponding to the target antenna panel.

Optionally, when the wireless communication device is a terminal, before obtaining the channel detection control information of each of the k antenna panels among the n antenna panels, the method further includes:

receiving channel detection indication information sent by a base station, the channel detection indication information including identities of the k antenna panels and the channel detection control information of each of the k antenna panels.

Optionally, the channel detection control information includes at least one of: a channel detection mechanism of a corresponding antenna panel, a channel detection parameter of the corresponding antenna panel, and a channel detection threshold of the corresponding antenna panel.

Optionally, when the wireless communication device is a terminal, before obtaining the channel detection control information of each of the k antenna panels among the n antenna panels, the method further includes:

determining the k antenna panels from the n antenna panels according to a type of data transceived by the n antenna panels within a preset time.

Optionally, determining the k antenna panels from the n antenna panels according to the type of data transceived by the n antenna panels within the preset time comprises:

when information received by the n antenna panels within the preset time is a synchronization signal block (SSB) or a channel state information reference signal (CSI-RS), determining an antenna panel having a strongest received power for the SSB or the CSI-RS to be the k antenna panels;

when the information received by the n antenna panels within the preset time is a physical downlink control channel (PDCCH) or a physical downlink shared channel (PDSCH), determining an antenna panel receiving the PDCCH or the PDSCH to be the k antenna panels; and when the information sent by the n antenna panels within the preset time is a channel sounding reference signal (SRS), a physical uplink control channel (PUCCH) or a physical uplink shared channel (PUSCH), determining an antenna panel sending the SRS, the PUCCH or the PUSCH to be the k antenna panels.

Optionally, the method further includes:

when the antenna panel sending the SRS, the PUCCH or the PUSCH is determined to be the k antenna panels, determining a beam-receiving direction corresponding to a beam for sending the SRS, the PUCCH or the PUSCH to be a beam-detecting direction for the channel detection.

When the k antenna panels are respectively controlled to perform the channel detection through the channel detection control information of each of the k antenna panels, the k antenna panels are respectively controlled to perform the channel detection in the beam-detecting direction through the channel detection control information of each of the k antenna panels.

In summary, the wireless communication device obtains channel detection control information of each of k antenna panels among n antenna panels of the wireless communication device; and respectively controls the k antenna panels to perform the channel detection through the channel detection control information of each of the k antenna panels. Therefore, for the wireless communication device with a plurality of antenna panels, the present disclosure respectively controls the k antenna panels to perform the channel detection through the channel detection control information of each of the k antenna panels among the n antenna panels of the wireless communication device, so that the wireless communication device can perform channel detection on different antenna panels based on different antenna panels thereof, which expands the application scenarios of the wireless communication device for channel detection.

Figure 3:
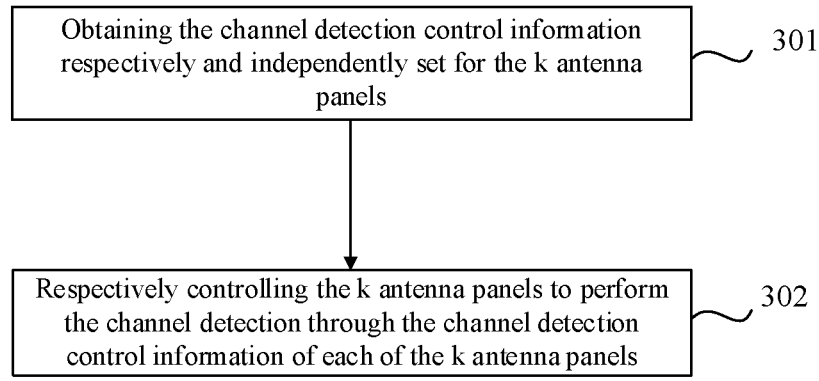
FIG. 3 is a flowchart of a method for channel detection according to an embodiment of the present disclosure.

In a possible implementation, for example, the above wireless communication device is the base station in the wireless communication system shown in FIG. 1. An embodiment of the present disclosure provides a method for channel detection. FIG. 3 illustrates a flowchart of a method for channel detection according to an embodiment of the present disclosure. This method can be applied to the wireless communication system shown in FIG. 1 and executed by the wireless communication device in the wireless communication system. Taking the wireless communication device being a base station as an example, the base station includes n antenna panels, and n is an integer greater than or equal to 2. As shown in FIG. 3, the method may include steps 301 and 302.

In step 301, channel detection control information respectively set for the k antenna panels is obtained.

The channel detection control information includes at least one of: a channel detection mechanism of a corresponding antenna panel, a channel detection parameter of the corresponding antenna panel, and a channel detection threshold of the corresponding antenna panel.

For the base station having the n antenna panels, the base station may transmit data to different terminals on the respective antenna panels at the same time, that is, the data transmitted by the respective antenna panels of the base station may be different. The antenna panels may obtain the channel detection control information respectively and independently set for the k antenna panels before each of the antenna panels transmits the data.

Optionally, the channel detection control information respectively set for the k antenna panels may be obtained from the base station itself. For example, the base station may set the channel detection control information corresponding to each antenna panel in advance for each antenna panel before sending data through the k antenna panels respectively. In a possible implementation, when k=2, that is, the base station needs to send data through two antenna panels respectively, and the base station may configure the channel detection control information for the two antenna panels respectively. Alternatively, the base station stores a table of correspondences between data types and the channel detection control information. When the base station determines the data that each antenna panel needs to transmit, it may query the table of correspondences between the data types and the channel detection control information to obtain the channel detection control information of each antenna panel.

For example, still taking k=2 as an example, the data that an antenna panel A needs to send is "downlink reference signal", and the data that an antenna panel B needs to send is "first service data". Optionally, the base station may configure different channel detection control information respectively for the antenna panel A and the antenna panel B. For example, the base station configures the channel detection mechanism of LBT cat.2, the channel detection parameter of single time granularity and the channel detection threshold of first threshold for the antenna panel A. The base station configures the detection mechanism of LBT cat.4, the channel detection parameter of channel access priority and the channel detection threshold of second threshold for the antenna panel B. The antenna panel A and the antenna panel B may respectively obtain their own channel detection control information. Optionally, among the k antenna panels, the channel detection control information configured by the base station for different antenna panels may not be completely the same. That is, for a plurality of antenna panels, part of the content in the channel detection control information configured by the base station for respective antenna panels may be the same, for example, the channel detection mechanisms are the same, but the channel detection parameters are different.

Optionally, when the respective antenna panels are in the process of performing their own channel detections, and the channel detection control information of some antenna panels needs to be adjusted, the channel detection control information corresponding to said some antenna panels that needs to be adjusted may be adjusted independently, which does not affect the channel detection of other antenna panels. For example, the above channel detection control information includes CWS, and all the k antenna panels use LBT cat.4 for channel detection. After the k antenna panels perform channel detection respectively, and before the k antenna panels perform next channel detection respectively, when some of the antenna panels change the value of CWS in the channel detection control information, the CWSs corresponding to said some antenna panels may be adjusted independently, which does not affect the channel detection of other antenna panels. Optionally, when all the k antenna panels need to adjust their corresponding CWSs, the base station may independently adjust the competition window size (CWS) corresponding to each of the k antenna panels. Optionally, when the channel detection control information of each of the k antenna panels needs to be adjusted, the adjustment may be made based on a feedback result ratio of HARQ (hybrid automatic repeat request) ACK (acknowledgement) of the data transmitted by the antenna panel, which will not be repeated herein.

Optionally, when the base station transmits data through each antenna panel, the data may be transmitted in a beam form. For an antenna panel, since the antenna panel may also correspond to a plurality of beam directions, different data may be sent in different beam directions. Therefore, when the base station obtains the channel detection control information for each of the k antenna panels, it may also obtain the channel detection control information corresponding to a target antenna panel. The channel detection control information corresponding to the target antenna panel includes channel detection control sub-information set for at least one beam direction corresponding to the target antenna panel. The target antenna panel is any one of the k antenna panels. The above channel detection control sub-information includes at least one of: a channel detection mechanism corresponding to the beam direction, a channel detection parameter corresponding to the beam direction, and a channel detection threshold corresponding to the beam direction.

In a possible implementation, the k antenna panels all send data in the beam form. When the base station configures the channel detection control information for the k antenna panels, the base station may first determine the beam corresponding to the target antenna panel, and associate each beam direction covered by the target antenna panel with the configured channel detection control information so as to further obtain the channel detection control sub-information set in each beam direction of the target antenna panel.

For example, there are beams A and B in the beam directions covered by a first target antenna panel. The base station may directly and independently configure the channel detection control sub-information for each beam direction covered by the first target antenna panel. For example, the channel detection control sub-information configured in the direction of beam A may include the channel detection mechanism of LBT cat.2, the channel detection parameter of single time granularity, the channel detection threshold of first threshold and the like; and the channel detection control sub-information configured in the direction of beam B may include the channel detection mechanism of LBT cat.4, the channel detection parameter of channel access priority, the channel detection threshold of second threshold and the like. Optionally, the channel detection control sub-information configured by the base station for different beam directions of the same antenna panel may be the same or may be different. Moreover, in the process of channel detection in each beam direction, the channel detection control sub-information in each beam direction may also be updated independently.

For example, when the base station uses LBT cat.4 to perform channel detection in both the directions of beam A and beam B for the above first target antenna panel, and when the base station needs to adjust the channel detection control sub-information of the direction of beam A of the first target antenna panel after starting the channel detection in the direction of beam A, for example, to change the value of CWS in the channel detection control sub-information, the base station may independently adjust the value of CWS of the direction of beam A of the first target antenna panel, which does not affect the subsequent channel detection of beam B in the first target antenna panel. Optionally, when the CWS corresponding to a certain beam direction of each of the k antenna panels needs to be adjusted, the base station may independently adjust the competition window size (CWS) corresponding to the certain beam direction of each of the k antenna panels. Optionally, when the respective channel detection control information corresponding to the other beam directions of the k antenna panels needs to be adjusted, the adjustment may be made in a similar manner, which will not be repeated here.

In step 302, the k antenna panels are respectively controlled through the channel detection control information of each of the k antenna panels to perform the channel detection.

Before the k antenna panels send data, the k antenna panels may respectively control the k antenna panels to perform channel detection according to their own channel detection control information obtained by themselves. For example, the corresponding channel detection control information of the first antenna panel among the k antenna panels includes a manner of LBT cat.4, a channel access priority of 1 and a channel detection threshold of A. The corresponding channel detection control information of the second antenna panel among the k antenna panels includes a manner of LBT cat.4, a channel access priority of 3 and a channel detection threshold of B.

Before the first antenna panel and the second antenna panel send data, the first antenna panel uses the channel detection with the LBT cat.4 and the channel access priority of 1 to detect the sum of RSSI in all the beam directions that can be received around the first antenna panel, and compares the RSSI sum with the threshold A. When the RSSI sum is higher than the threshold A, it indicates that the channel is busy, otherwise the channel is idle. The second antenna panel also uses the channel detection with the LBT cat.4 and the channel access priority of 3 to detect the sum of RSSI in all the beam directions that can be received around the second antenna panel, and compares the RSSI sum with the threshold B. When the RSSI sum is higher than the threshold B, it indicates that the channel is busy, otherwise the channel is idle.

Optionally, corresponding to the foregoing implementation based on beam form transmission, among the k antenna panels of the base station, the target antenna panel is controlled to sequentially perform the channel detection in the at least one beam direction through the channel detection control sub-information respectively corresponding to the at least one beam direction and according to the detection order of the at least one beam direction. Since the priority of the corresponding terminal in each beam direction is different, in different beam directions of the same antenna panel, the antenna panel also needs to determine the detection order of the at least one beam direction according to the priority of the terminal corresponding to the at least one beam direction. For example, for the antenna panel, a beam 1 correspondingly covers a terminal 1, and a beam 2 correspondingly covers a terminal 2. The required delay of the data of the terminal 1 is shorter than the required delay of the data of the terminal 2. When the antenna panel is necessary to send data to the terminal 1 and the terminal 2 at the same time, the channel detection of the antenna panel for the beam 1 is prior to the channel detection for the beam 2, that is, the antenna panel is detected according to the priority order of the beam.

Optionally, a continuous detection duration of the antenna panel in each of the at least one beam direction is not greater than a duration threshold Y. That is, the channel detection duration of the antenna panel for the beam 1 cannot exceed the duration threshold Y, and the subsequent channel detection duration of the antenna panel for the beam 2 cannot exceed the duration threshold Y. In a possible implementation, when the channel detection duration of the antenna panel for the beam 1 reaches the duration threshold Y, and the channel on the beam 1 is still not detected to be idle, the antenna panel will be automatically adjusted to perform the channel detection for the beam 2 after the channel detection duration threshold Y for the beam 1, so as to avoid that the antenna panel always performs a channel detection with a result of being not idle on the same beam, and thus the channel detection in other beam directions is procrastinated.

In summary, the wireless communication device obtains channel detection control information of each of k antenna panels among n antenna panels of the wireless communication device; and respectively controls the k antenna panels to perform the channel detection through the channel detection control information of each of the k antenna panels. Therefore, for the wireless communication device with a plurality of antenna panels, the present disclosure respectively controls the k antenna panels to perform the channel detection through the channel detection control information of each of the k antenna panels among the n antenna panels of the wireless communication device, so that the wireless communication device can perform channel detection on different antenna panels based on different antenna panels thereof, which expands the application scenarios of the wireless communication device for channel detection.

Figure 4:
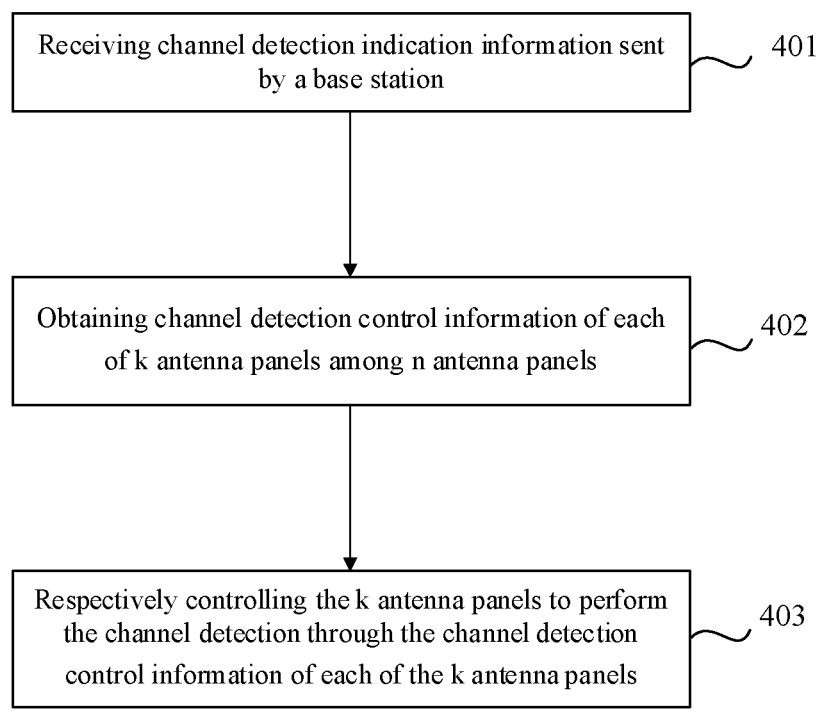
FIG. 4 is a flowchart of a method for channel detection according to an embodiment of the present disclosure.

In a possible implementation, for example, the above wireless communication device is the terminal in the wireless communication system shown in FIG. 1, an embodiment of the present disclosure provides a method for channel detection. FIG. 4 illustrates a flowchart of a method for channel detection according to an embodiment of the present disclosure. This method may be applied to the wireless communication system shown in FIG. 1 and executed by the wireless communication device in the wireless communication system. Taking the wireless communication device being the terminal in the wireless communication system as an example, the terminal includes n antenna panels, and n is an integer greater than or equal to 2. As illustrated in FIG. 4, the method may include steps 401, 402 and 403.

In step 401, channel detection indication information sent by a base station is received.

The channel detection instruction information includes identities of the k antenna panels and the channel detection control information of each of the k antenna panels. The channel detection control information includes at least one of: a channel detection mechanism of a corresponding antenna panel, a channel detection parameter of the corresponding antenna panel, and a channel detection threshold of the corresponding antenna panel.

Optionally, the channel detection indication information received from the terminal from the base station may be obtained from DCI (downlink control information) sent by the base station to the terminal, that is, the terminal analyzes the DCI sent by the base station and obtains the channel detection indication information therein. In a first case, the DCI signaling includes the identities of the k antenna panels and the channel detection control information of each of the k antenna panels, and for example, k=2. The DCI signaling includes an antenna panel identity 1 and the channel detection control information corresponding to the antenna panel identity 1, and the DCI signaling also includes the antenna panel identity 2 and the channel detection control information corresponding to the antenna panel identity 2. In a second case, the DCI signaling only includes the channel detection parameter of one antenna panel, and for example, k=2. The base station sends the DCI signaling through CORESET #1 (control resource set) corresponding to the antenna panel identity 1, so the DCI signaling indicates the channel detection parameter corresponding to antenna panel identity 1. The base station sends the DCI signaling through CORESET #2 (control resource set) corresponding to the antenna panel identity 2, so the DCI signaling indicates the channel detection parameter corresponding to antenna panel identity 2. That is, in the second case, the antenna panel identity is implicitly indicated by the corresponding CORESET resource. Alternatively, the channel detection indication information received by the terminal from the base station may be obtained from RRC (radio resource control) signaling sent from the base station to the terminal, that is, the terminal analyzes the RRC signaling sent by the base station and obtains the channel detection indication information therein.

Optionally, the application scenario in which the terminal obtains the corresponding channel detection indication information from the RRC signaling sent by the base station to the terminal may be a configured grant service. In this service, the base station has configured periodic time-frequency resources in advance, so the base station does not need to send the DCI signaling to the terminal every time for scheduling, and the base station may directly superimpose the channel detection indication information corresponding to the terminal into the RRC signaling, therefore the terminal may obtain the corresponding channel detection indication information by receiving the RRC signaling.

In an embodiment of the present disclosure, the above k antenna panels that need the channel detection and the channel detection indication information of each antenna panel are indicated by the base station. In another possible example, the above k antenna panels that need the channel detection and/or the channel detection indication information of each antenna panel may also be determined by the terminal.

The terminal may be indirectly indicated through a type of data transceived by the n antenna panels within a preset time. That is, the terminal determines the above k antenna panels from the n antenna panels according to the type of data transceived by the n antenna panels within the preset time.

The preset time may be a time period with a preset length before the current moment, that is, the data transceived by the n antenna panels within the preset time is data transceived by the n antenna panels within the time period with the preset length before the current moment.

Alternatively, the preset time may also be a data transceiving time closest to the current moment, that is, the data transceived by the n antenna panels within the preset time is the last data received or sent by the n antenna panels.

For example, if the type of data received by the terminal within the preset time is SSB (synchronization signal block) or NZP CSI-RS (nonzero power channel state information reference signal), the terminal may select the antenna panel that has received the SSB or CSI-RS within the preset time from the n antenna panels, and from the antenna panel that has received the SSB or CSI-RS within the preset time, determines the antenna panel having a strongest received power for the SSB or the CSI-RS to be the k antenna panels.

In a possible implementation, if the type of data received by the terminal within the preset time is PDCCH (physical downlink control channel) or PDSCH (physical downlink shared channel), the terminal may select the antenna panel that has received the PDCCH or PDSCH within the preset time period from the n antenna panels, and determine the antenna panel that has received the PDCCH or PDSCH within the preset time period to be the k antenna panels.

In a possible implementation, if the type of data sent by the terminal within the preset time is SRS (sounding reference signal), PUCCH (physical uplink control channel) or PUSCH (physical uplink shared channel), the terminal may select the antenna panel that has sent the SRS, PUCCH or PUSCH within the preset time period from the n antenna panels, and determines the antenna panel that has sent the SRS, PUCCH or PUSCH within the preset time to be the k antenna panels.

Further, the terminal may also send data based on a beam form. In this case, the terminal may also determine the beam direction corresponding to the data received or sent by the k antenna panels to be a beam-detecting direction for channel detection.

Taking the type of data sent by the terminal within the preset time being the SRS, PUCCH, or PUSCH as an example, the terminal may also determine the antenna panel sending the SRS, PUCCH or PUSCH to be the k antenna panels, and at the same time, determines a beam-receiving direction corresponding to the beam for sending the SRS, PUCCH or PUSCH to be the beam-detecting direction for the channel detection. Subsequently, the terminal controls the k antenna panels to perform the channel detection in such beam direction.

In step 402, channel detection control information of each of the k antenna panels among the n antenna panels is obtained.

In step 403, the k antenna panels are respectively controlled to perform the channel detection through the channel detection control information of each of the k antenna panels.

The execution processes of step 402 and step 403 may respectively refer to the description of the corresponding step 301 and step 302 in the embodiment of FIG. 3, which will not be repeated here.

In an exemplary embodiment, when the terminal determines the beam-detecting direction of each of the antenna panels, the terminal may respectively control the k antenna panels to perform the channel detection in the beam-detecting direction of each of the k antenna panels through the channel detection control information of each of the k antenna panels.

In summary, the wireless communication device obtains channel detection control information of each of k antenna panels among n antenna panels of the wireless communication device; and respectively controls the k antenna panels to perform the channel detection through the channel detection control information of each of the k antenna panels. Therefore, for the wireless communication device with a plurality of antenna panels, the present disclosure respectively controls the k antenna panels to perform the channel detection through the channel detection control information of each of the k antenna panels among the n antenna panels of the wireless communication device, so that the wireless communication device can perform channel detection on different antenna panels based on different antenna panels thereof, which expands the application scenarios of the wireless communication device for channel detection.

The following are device embodiments of the present disclosure, which can be used to implement the method embodiments of the present disclosure. For details that are not disclosed in the device embodiments of the present disclosure, please refer to the method embodiments of the present disclosure.

Figure 5:
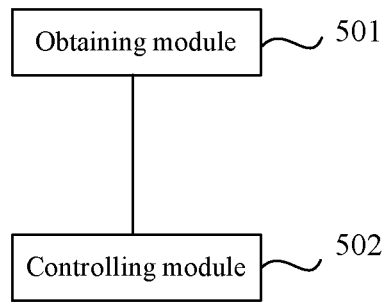
FIG. 5 is a block diagram showing a device for channel detection according to an exemplary embodiment.

FIG. 5 is a block diagram illustrating a device for channel detection according to an exemplary embodiment. As shown in FIG. 5, the device for channel detection may be implemented as all or part of the wireless communication device in the implementation environment shown in FIG. 1 by hardware or combination of hardware with software to execute the steps in any one of the embodiments in FIGS. 2, 3 and 4 that are performed by the wireless communication device. The device for channel detection may include:

an obtaining module 501, configured to obtain channel detection control information of each of k antenna panels among the n antenna panels; and a controlling module 502, configured to respectively control the k antenna panels to perform the channel detection through the channel detection control information of each of the k antenna panels.

Optionally, the obtaining module 501 includes a first obtaining submodule configured to obtain the channel detection control information respectively set for the k antenna panels when the wireless communication device is a base station.

The channel detection control information includes at least one of: a channel detection mechanism of a corresponding antenna panel, a channel detection parameter of the corresponding antenna panel, and a channel detection threshold of the corresponding antenna panel.

Optionally, the first obtaining submodule is configured to obtain the channel detection control information corresponding to a target antenna panel, the channel detection control information corresponding to the target antenna panel includes channel detection control sub-information set for at least one beam direction corresponding to the target antenna panel, and the target antenna panel is any one of the k antenna panels.

The channel detection control sub-information includes at least one of: a channel detection mechanism corresponding to a beam direction, a channel detection parameter corresponding to the beam direction, and a channel detection threshold corresponding to the beam direction.

Optionally, the device for channel detection further includes:

a determining module, configured to determine a detection order of the at least one beam direction according to a priority of a terminal corresponding to the at least one beam direction before the control module respectively controls the k antenna panels to perform the channel detection through the channel detection control information of each of the k antenna panels.

The control module is configured to, according to the detection order of the at least one beam direction, control the target antenna panel to sequentially perform the channel detection in the at least one beam direction through the channel detection control sub-information respectively corresponding to the at least one beam direction.

Optionally, a continuous detection duration in each of the at least one beam direction is not greater than a duration threshold.

Optionally, the channel detection parameter includes a contention window size (CWS).

The first obtaining submodule is configured to, when the channel detection control information includes the channel detection parameter of the corresponding antenna panel, independently adjust competition window sizes (CWSs) respectively corresponding to the k antenna panels.

Optionally, the channel detection parameter includes a contention window size (CWS).

The first obtaining submodule is configured to, when the channel detection control sub-information includes the channel detection parameter corresponding to the beam direction, adjust respective competition window sizes (CWSs) of the at least one beam direction corresponding to the target antenna panel. The target antenna panel is any one of the k antenna panels.

Optionally, the device for channel detection further includes: a receiving module, configured to, when the wireless communication device is a terminal, receive channel detection indication information sent by a base station before the obtaining module obtains the channel detection control information of each of the k antenna panels among the n antenna panels. The channel detection indication information includes identities of the k antenna panels and the channel detection control information of each of the k antenna panels.

Optionally, the channel detection control information includes at least one of: a channel detection mechanism of a corresponding antenna panel, a channel detection parameter of the corresponding antenna panel, and a channel detection threshold of the corresponding antenna panel.

Optionally, the device for channel detection further includes:

a panel determining module, configured to, when the wireless communication device is a terminal, determine the k antenna panels from the n antenna panels according to a type of data transceived by the n antenna panels within a preset time before the obtaining module obtains the channel detection control information of each of the k antenna panels among the n antenna panels.

Optionally, the panel determining module includes:

a first determining submodule, configured to, when information received by the n antenna panels within the preset time is a synchronization signal block (SSB) or a channel state information reference signal (CSI-RS), determine an antenna panel having a strongest received power for the SSB or the CSI-RS to be the k antenna panels;

a second determining submodule, configured to, when the information received by the n antenna panels within the preset time is a physical downlink control channel (PDCCH) or a physical downlink shared channel (PDSCH), determine an antenna panel receiving the PDCCH or the PDSCH to be the k antenna panels; and a third determining submodule, configured to, when the information sent by the n antenna panels within the preset time is a channel sounding reference signal (SRS), a physical uplink control channel (PUCCH) or a physical uplink shared channel (PUSCH), determine an antenna panel sending the SRS, the PUCCH or the PUSCH to be the k antenna panels.

Optionally, the device for channel detection further includes:

a direction determining module, configured to, when the third determining submodule determines the antenna panel sending the SRS, the PUCCH or the PUSCH to be the k antenna panels, determine a beam-receiving direction corresponding to a beam for sending the SRS, the PUCCH or the PUSCH to be a beam-detecting direction for the channel detection.

The controlling module is configured to respectively control the k antenna panels to perform the channel detection in the beam-detecting direction through the channel detection control information of each of the k antenna panels.

An exemplary embodiment of the present disclosure also provides a device for channel detection, which can implement all or part of the steps performed by the wireless communication device in the embodiments shown in FIG. 2, FIG. 3, or FIG. 4 of the present disclosure. The wireless communication device includes n antenna panels, n is an integer greater than or equal to 2, and the channel detection device includes a processor and a memory for storing executable instructions of the processor.

The processor is configured to:
obtain channel detection control information of each of k antenna panels among the n antenna panels; and
respectively control the k antenna panels to perform the channel detection through the channel detection control information of each of the k antenna panels.

Optionally, when the wireless communication device is a base station, when obtaining the channel detection control information of each of the k antenna panels among the n antenna panels, the processor is configured to:
obtain the channel detection control information respectively set for the k antenna panels.

The channel detection control information includes at least one of: a channel detection mechanism of a corresponding antenna panel, a channel detection parameter of the corresponding antenna panel, and a channel detection threshold of the corresponding antenna panel.

Optionally, when obtaining the channel detection control information respectively set for the k antenna panels, the processor is configured to:
obtain the channel detection control information corresponding to a target antenna panel, the channel detection control information corresponding to the target antenna panel including channel detection control sub-information set for at least one beam direction corresponding to the target antenna panel, and the target antenna panel being any one of the k antenna panels.

The channel detection control sub-information includes at least one of: a channel detection mechanism corresponding to a beam direction, a channel detection parameter corresponding to the beam direction, and a channel detection threshold corresponding to the beam direction.

Optionally, before respectively controlling the k antenna panels to perform the channel detection through the channel detection control information of each of the k antenna panels, the processor is further configured to:
determine a detection order of the at least one beam direction according to a priority of a terminal corresponding to the at least one beam direction.

Respectively controlling the k antenna panels to perform the channel detection through the channel detection control information of each of the k antenna panels includes:
according to the detection order of the at least one beam direction, controlling the target antenna panel to sequentially perform the channel detection in the at least one beam direction through the channel detection control sub-information respectively corresponding to the at least one beam direction.

Optionally, the processor is configured so that a continuous detection duration in each of the at least one beam direction is not greater than a duration threshold.

Optionally, the channel detection parameter includes a contention window size (CWS), and if the channel detection control information includes the channel detection parameter of the corresponding antenna panel, when obtaining the channel detection control information respectively set for the k antenna panels, the processor is configured to:
adjust competition window sizes (CWSs) respectively corresponding to the k antenna panels.

Optionally, the channel detection parameter includes a contention window size (CWS), and if the channel detection control sub-information includes the channel detection parameter corresponding to the beam direction, when obtaining the channel detection control information corresponding to the target antenna panel, the processor is configured to:
adjust respective competition window sizes (CWSs) of the at least one beam direction corresponding to the target antenna panel.

Optionally, when the wireless communication device is a terminal, before obtaining the channel detection control information of each of the k antenna panels among the n antenna panels, the processor is configured to:
receive channel detection indication information sent by a base station, the channel detection indication information including identities of the k antenna panels and the channel detection control information of each of the k antenna panels.

Optionally, the channel detection control information includes at least one of:
a channel detection mechanism of a corresponding antenna panel, a channel detection parameter of the corresponding antenna panel, and a channel detection threshold of the corresponding antenna panel.

Optionally, when the wireless communication device is a terminal, before obtaining the channel detection control information of each of the k antenna panels among the n antenna panels, the processor is further configured to:
determine the k antenna panels from the n antenna panels according to a type of data transceived by the n antenna panels within a preset time.

Optionally, when determining the k antenna panels from the n antenna panels according to the type of data transceived by the n antenna panels within the preset time, the processor is further configured to:
when information received by the n antenna panels within the preset time is a synchronization signal block (SSB) or a channel state information reference signal (CSI-RS), determine an antenna panel having a strongest received power for the SSB or the CSI-RS to be the k antenna panels;
when the information received by the n antenna panels within the preset time is a physical downlink control channel (PDCCH) or a physical downlink shared channel (PDSCH), determine an antenna panel receiving the PDCCH or the PDSCH to be the k antenna panels; and
when the information sent by the n antenna panels within the preset time is a channel sounding reference signal (SRS), a physical uplink control channel (PUCCH) or a physical uplink shared channel (PUSCH), determine an antenna panel sending the SRS, the PUCCH or the PUSCH to be the k antenna panels.

Optionally, the processor is further configured to:
when the antenna panel sending the SRS, the PUCCH or the PUSCH is determined to be the k antenna panels, determine a beam-receiving direction corresponding to a beam for sending the SRS, the PUCCH or the PUSCH to be a beam-detecting direction for the channel detection.

When respectively controlling the k antenna panels to perform the channel detection through the channel detection control information of each of the k antenna panels, the processor is further configured to:

respectively control the k antenna panels to perform the channel detection in the beam-detecting direction through the channel detection control information of each of the k antenna panels.

It should be noted that when the device provided in the above embodiment realizes the function thereof, the division of the above-mentioned functional modules is used as an example for only illustration. In actual applications, the above-mentioned function may be realized by different functional modules according to actual needs. That is, the content structure of the device is divided into different functional modules to complete all or part of the function described above.

Regarding the device in the foregoing embodiment, the specific manner in which each module performs operation has been described in detail in the method embodiment, and detailed description thereof will not be repeated here.

The foregoing mainly introduces the solutions provided by the embodiments of the present disclosure from the perspective of the wireless communication device. It can be understood that in order to implement the above-mentioned functions, the wireless communication device includes hardware structures and/or software modules corresponding to each function. In combination with the units and algorithm steps of the examples described in the embodiments of the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the embodiments of the present disclosure.

Figure 6:
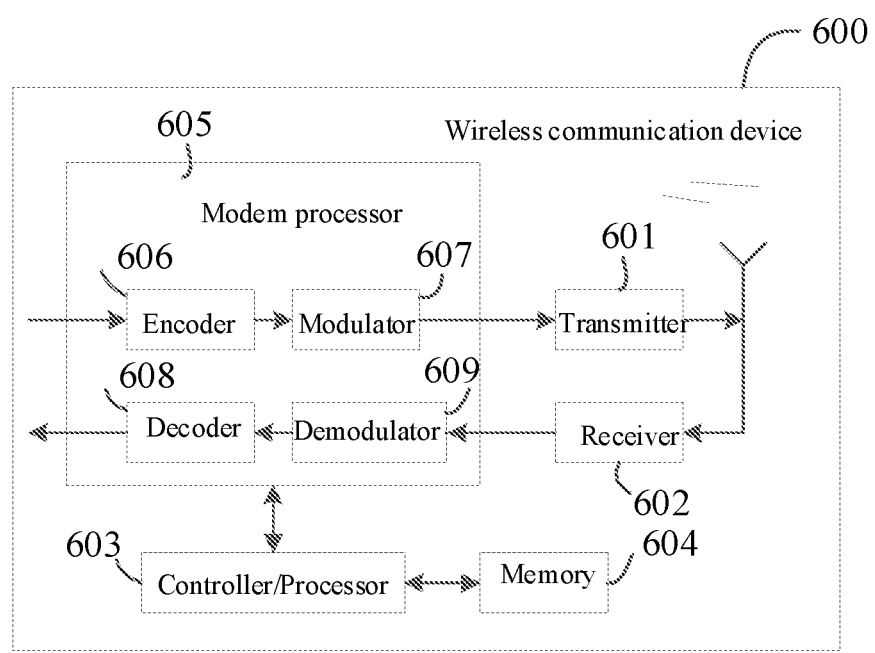
FIG. 6 is a schematic structural diagram illustrating a wireless communication device according to an exemplary embodiment.

FIG. 6 is a schematic structural diagram illustrating a wireless communication device according to an exemplary embodiment.

The wireless communication device 600 includes a transmitter 601, a receiver 602, and a processor 603. The processor 603 may also be a controller, which is represented as "controller/processor 603" in FIG. 6. Optionally, the wireless communication device 600 may further include a modem processor 605. The modem processor 605 may include an encoder 606, a modulator 607, a decoder 608, and a demodulator 609.

In an example, the transmitter 601 adjusts (for example, simulates and converts, filters, amplifies, and up-converts and the like) output sample and generates an uplink signal, which is transmitted to the base station described in the above-mentioned embodiment via an antenna. On the downlink, the antenna receives the downlink signal transmitted by the base station in the above embodiment. The receiver 602 conditions (for example, filters, amplifies, down-converts, digitizes and the like) the signal received from the antenna and provides input sample. In the modem processor 605, the encoder 606 receives service data and signaling message to be transmitted on the uplink, and processes (for example, formats, encodes, and interleaves) the service data and signaling messages. The modulator 607 further processes (for example, symbol-maps and modulates) the encoded service data and signaling message and provides output sample. The demodulator 609 processes (for example, demodulates) the input sample and provides symbol estimate. The decoder 608 processes (e.g., deinterleaves and decodes) the symbol estimate and provides decoded data and signaling message sent to the wireless communication device 600. The encoder 606, the modulator 607, the demodulator 609, and the decoder 608 may be implemented by a synthesized modem processor 605. These units may perform processing according to the radio access technology adopted by the radio access network (for example, the access technology of LTE and other evolved systems). It should be noted that when the wireless communication device 600 does not include the modem processor 605, the foregoing functions of the modem processor 605 may also be implemented by the processor 603.

The processor 603 controls and manages actions of the wireless communication device 600, and is used to execute the processing procedure performed by the wireless communication device 600 in the foregoing embodiment of the present disclosure. For example, the processor 603 is further configured to execute each step on the wireless communication device side in the foregoing method embodiment, and/or other steps of the technical solution described in the embodiment of the present disclosure.

Further, the wireless communication device 600 may further include a memory 604, and the memory 604 is used to store program codes and data for the wireless communication device 600.

It can be understood that FIG. 6 only illustrates a simplified design of the wireless communication device 600. In practical applications, the wireless communication device 600 may include any number of transmitters, receivers, processors, modem processors, and memories, and all wireless communication devices that can implement the embodiments of the present disclosure are within the protection scope of the embodiments of the present disclosure.

Those skilled in the art should understand that in one or more of the foregoing examples, the functions described in the embodiments of the present disclosure may be implemented by hardware, software, firmware, or any combination thereof. When the functions are implemented by software, these functions can be stored in a computer-readable medium or transmitted as one or more instructions or codes on the computer-readable medium. The computer-readable medium includes a computer storage medium and a communication medium. The communication medium includes any medium that facilitates the transfer of a computer program from one place to another place. The storage medium may be any available medium that can be accessed by a general-purpose or special-purpose computer.

An embodiment of the present disclosure also provides a computer storage medium for storing computer software instructions used for the above-mentioned wireless communication device, which contains a program designed for executing the above-mentioned method for channel detection.

It should be understood that the term "a plurality of" mentioned herein refers to two or more. The term "and/or" describes the association relationship of associated objects, indicating that there may be three types of relationships, for example, A and/or B may mean that: A exists alone, A and B exist at the same time, and B exists alone. The character "/" generally indicates that the associated objects before and after the character "/" are in an "or" relationship.

Those skilled in the art will easily conceive of other embodiments of the present disclosure after considering the specification and practicing the invention disclosed herein.

The present application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The specification and the embodiments are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from the scope thereof. The scope of the present disclosure is only limited by the appended claims.

What is claimed is:

1. A method for channel detection, which is performed by a wireless communication device comprising n antenna panels, n being an integer greater than or equal to 2, the method comprising:
    obtaining channel detection control information of each of k antenna panels among the n antenna panels, where k is an integer greater than or equal to 1 and less than or equal to n; and
    respectively controlling the k antenna panels to perform the channel detection through the channel detection control information of each of the k antenna panels,
    wherein the channel detection control information comprises a channel detection mechanism of a corresponding antenna panel.

2. The method according to claim 1, wherein when the wireless communication device is a base station, obtaining the channel detection control information of each of the k antenna panels among the n antenna panels comprises:
    obtaining the channel detection control information respectively set for the k antenna panels,
    wherein the channel detection control information further comprises at least one of:
    a channel detection parameter of the corresponding antenna panel, and a channel detection threshold of the corresponding antenna panel.

3. The method according to claim 2, wherein said obtaining the channel detection control information respectively set for the k antenna panels comprises:
    obtaining the channel detection control information corresponding to a target antenna panel, the channel detection control information corresponding to the target antenna panel comprising channel detection control sub-information set for at least one beam direction corresponding to the target antenna panel, and the target antenna panel being any one of the k antenna panels,
    wherein the channel detection control sub-information comprises at least one of:
    a channel detection mechanism corresponding to a beam direction, a channel detection parameter corresponding to the beam direction, and a channel detection threshold corresponding to the beam direction.

4. The method according to claim 3, wherein prior to said respectively controlling the k antenna panels to perform the channel detection through the channel detection control information of each of the k antenna panels, the method further comprises:
    determining a detection order of the at least one beam direction according to a priority of a terminal corresponding to the at least one beam direction, and
    respectively controlling the k antenna panels to perform the channel detection through the channel detection control information of each of the k antenna panels comprises:
    according to the detection order of the at least one beam direction, controlling the target antenna panel to sequentially perform the channel detection in the at least one beam direction through the channel detection control sub-information respectively corresponding to the at least one beam direction.

5. The method according to claim 4, wherein a continuous detection duration in each of the at least one beam direction is not greater than a duration threshold.

6. The method according to claim 2, wherein the channel detection parameter comprises a contention window size (CWS), and
    when the channel detection control information comprises the channel detection parameter of the corresponding antenna panel, obtaining the channel detection control information respectively set for the k antenna panels comprises:
    adjusting competition window sizes (CWSs) respectively corresponding to the k antenna panels.

7. The method according to claim 3, wherein the channel detection parameter comprises a contention window size (CWS), and when the channel detection control sub-information comprises the channel detection parameter corresponding to the beam direction, obtaining the channel detection control information corresponding to the target antenna panel comprises:
    adjusting respective competition window sizes (CWSs) of the at least one beam direction corresponding to the target antenna panel.

8. The method according to claim 1, wherein when the wireless communication device is a terminal, the method further comprises:
    receiving channel detection indication information sent by a base station, the channel detection indication information comprising identities of the k antenna panels and the channel detection control information of each of the k antenna panels.

9. The method according to claim 8, wherein the channel detection control information further comprises at least one of:
    a channel detection parameter of the corresponding antenna panel, and a channel detection threshold of the corresponding antenna panel.

10. The method according to claim 1, wherein when the wireless communication device is a terminal, before obtaining the channel detection control information of each of the k antenna panels among the n antenna panels, the method further comprises:
    determining the k antenna panels from the n antenna panels according to a type of data transceived by the n antenna panels within a preset time.

11. The method according to claim 10, wherein said determining the k antenna panels from the n antenna panels according to the type of data transceived by the n antenna panels within the preset time comprises:
    when information received by the n antenna panels within the preset time is a synchronization signal block (SSB) or a channel state information reference signal (CSI-RS), determining antenna panels having a strongest received power for the SSB or the CSI-RS to be the k antenna panels;
    when the information received by the n antenna panels within the preset time is a physical downlink control channel (PDCCH) or a physical downlink shared channel (PDSCH), determining antenna panels receiving the PDCCH or the PDSCH to be the k antenna panels; and when the information sent by the n antenna panels within the preset time is a channel sounding reference signal (SRS), a physical uplink control channel (PUCCH) or a physical uplink shared channel (PUSCH), determining antenna panels sending the SRS, the PUCCH or the PUSCH to be the k antenna panels.

12. The method according to claim 11, wherein the method further comprises:

when the antenna panel sending the SRS, the PUCCH or the PUSCH is determined to be the k antenna panels, determining a beam-receiving direction corresponding to a beam for sending the SRS, the PUCCH or the PUSCH to be a beam-detecting direction for the channel detection, and respectively controlling the k antenna panels to perform the channel detection through the channel detection control information of each of the k antenna panels comprises:

respectively controlling the k antenna panels to perform the channel detection in the beam-detecting direction through the channel detection control information of each of the k antenna panels.

13. A device for channel detection, which is applied to a wireless communication device comprising n antenna panels, n being an integer greater than or equal to 2, the device for channel detection comprising:

a processor; and a memory having instruction stored thereon that, when being executed by the processor, cause the processor to execute a method for channel detection comprising:

obtaining channel detection control information of each of k antenna panels among the n antenna panels, where k is an integer greater than or equal to 1 and less than or equal to n; and respectively controlling the k antenna panels to perform the channel detection through the channel detection control information of each of the k antenna panels, wherein the channel detection control information comprises a channel detection mechanism of a corresponding antenna panel.

14. The device for channel detection according to claim 13, wherein when the wireless communication device is a base station, said obtaining the channel detection control information of each of the k antenna panels among the n antenna panels comprises:

obtaining the channel detection control information respectively set for the k antenna panels, wherein the channel detection control information further comprises at least one of:

a channel detection parameter of the corresponding antenna panel, and a channel detection threshold of the corresponding antenna panel.

15. The device for channel detection according to claim 14, wherein said obtaining the channel detection control information respectively set for the k antenna panels comprises:

obtaining the channel detection control information corresponding to a target antenna panel, the channel detection control information corresponding to the target antenna panel comprising channel detection control sub-information set for at least one beam direction corresponding to the target antenna panel, and the target antenna panel being any one of the k antenna panels, wherein the channel detection control sub-information comprises at least one of:

a channel detection mechanism corresponding to a beam direction, a channel detection parameter corresponding to the beam direction, and a channel detection threshold corresponding to the beam direction.

16. The device for channel detection according to claim 15, wherein prior to said respectively controlling the k antenna panels to perform the channel detection through the channel detection control information of each of the k antenna panels, the method further comprises:

determining a detection order of the at least one beam direction according to a priority of a terminal corresponding to the at least one beam direction, and respectively controlling the k antenna panels to perform the channel detection through the channel detection control information of each of the k antenna panels comprises:

according to the detection order of the at least one beam direction, controlling the target antenna panel to sequentially perform the channel detection in the at least one beam direction through the channel detection control sub-information respectively corresponding to the at least one beam direction.

17. The device for channel detection according to claim 16, wherein a continuous detection duration in each of the at least one beam direction is not greater than a duration threshold.

18. The device for channel detection according to claim 14, wherein the channel detection parameter comprises a contention window size (CWS), and when the channel detection control information comprises the channel detection parameter of the corresponding antenna panel, obtaining the channel detection control information respectively set for the k antenna panels comprises:

adjusting competition window sizes (CWSs) respectively corresponding to the k antenna panels.

19. The device for channel detection according to claim 15, wherein the channel detection parameter comprises a contention window size (CWS), and when the channel detection control sub-information comprises the channel detection parameter corresponding to the beam direction, obtaining the channel detection control information corresponding to the target antenna panel comprises:

adjusting respective competition window sizes (CWSs) of the at least one beam direction corresponding to the target antenna panel.

20. The device for channel detection according to claim 13, wherein when the wireless communication device is a terminal, the method further comprises:

receiving channel detection indication information sent by a base station, the channel detection indication information comprising identities of the k antenna panels and the channel detection control information of each of the k antenna panels.

* * * * *